United States Patent
Weidmann

(10) Patent No.: US 6,926,464 B1
(45) Date of Patent: Aug. 9, 2005

(54) DETENTION POND WATER QUALITY APPARATUS AND SYSTEM

(76) Inventor: Lawrence W. Weidmann, 110 Georgian Manor Ct., Alpharetta, GA (US) 30022

( * ) Notice: Subject to any disclaimer, the term of this patent is extended or adjusted under 35 U.S.C. 154(b) by 0 days.

(21) Appl. No.: 10/690,695

(22) Filed: Oct. 22, 2003

(51) Int. Cl.$^7$ .............................. E02B 11/00; C02F 9/00
(52) U.S. Cl. ............................. 405/40; 405/36; 405/42; 405/43; 210/170; 210/747; 239/145
(58) Field of Search .............................. 405/36, 40–43, 405/51; 210/170, 747, 532.2; 239/145, 542; 138/96 R, 96 T, 109

(56) References Cited

U.S. PATENT DOCUMENTS

| | | | |
|---|---|---|---|
| 400,884 A | 4/1889 | Wilbur | |
| 902,104 A | 10/1908 | Neireiter | |
| 913,338 A | 2/1909 | Williams | |
| 1,231,308 A | * 6/1917 | Steelquist | 405/51 |
| 1,398,007 A | 11/1921 | Davis | |
| 1,760,314 A | * 5/1930 | Murrey | 210/532.2 |
| 1,960,472 A | * 5/1934 | Balaam et al. | 405/51 |
| 3,901,448 A | * 8/1975 | Babin | 239/145 |
| 4,246,305 A | 1/1981 | Delattre | |
| 4,293,237 A | * 10/1981 | Robey et al. | 405/39 |
| 4,504,391 A | 3/1985 | Weems, Sr. | |
| 4,720,209 A | 1/1988 | Iams | |
| 4,919,568 A | 4/1990 | Hurley | |
| 4,923,330 A | 5/1990 | DeTommaso | |
| 4,988,235 A | 1/1991 | Hurley | |
| 5,198,113 A | 3/1993 | Daniels | |
| 5,297,895 A | 3/1994 | Johnson | |
| 5,458,436 A | * 10/1995 | Plowman et al. | 405/36 |
| 5,597,264 A | * 1/1997 | Laak | 210/532.2 |
| 5,645,732 A | 7/1997 | Daniels | |
| 5,988,943 A | * 11/1999 | McCord | 210/170 |
| 6,613,228 B2 | * 9/2003 | Petersen et al. | 405/36 |
| 6,698,975 B1 | * 3/2004 | Benecke | 405/43 |

FOREIGN PATENT DOCUMENTS

JP          2000229361      *  8/2000

* cited by examiner

Primary Examiner—Jong-Suk (James) Lee
(74) Attorney, Agent, or Firm—Greg O'Bradovich, P.C.

(57) ABSTRACT

A water quality apparatus and system utilized in permanent extended dry detention basins having an outlet control structure vertically mounted within a basin and a semi-round pipe (typically including gravel) attached to the forward edge. Typically, in this type of structure, debris flows over the top of the pipe and clogs the semi-round pipe and its outlet into the outlet control structure. The water quality apparatus is typically a pipe fixture having an outlet end that fits into the control structure and an inlet end comprising several perforated pipes (forming a series of holes) that protrude into the semi-round pipe. The holes allow the water to flow into the piping system and discourage any debris from flowing into the piping system and clogging it. As water flows through the gravel and into the perforated pipe, water can drain into the water quality apparatus and through the outlet control structure.

7 Claims, 6 Drawing Sheets

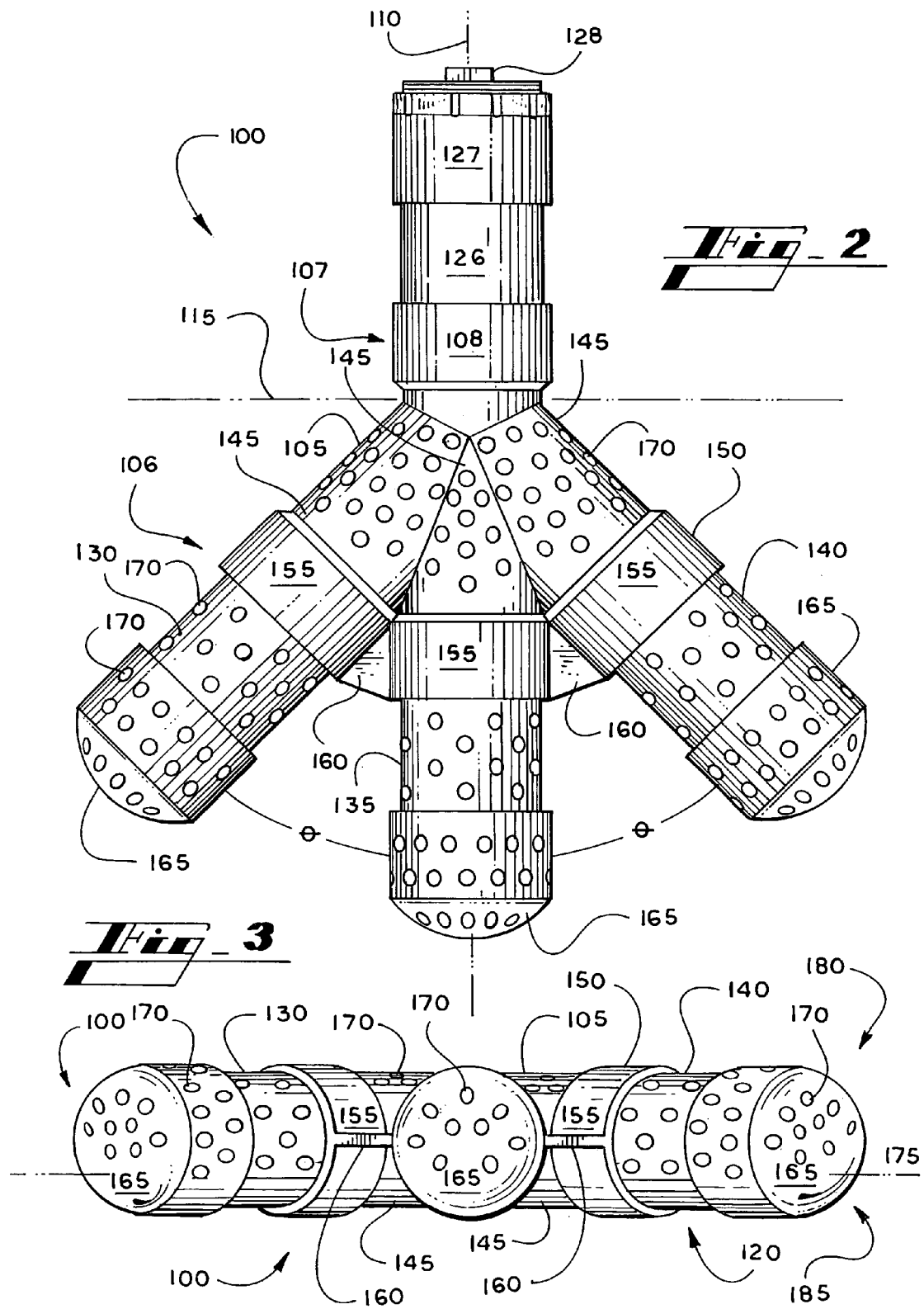

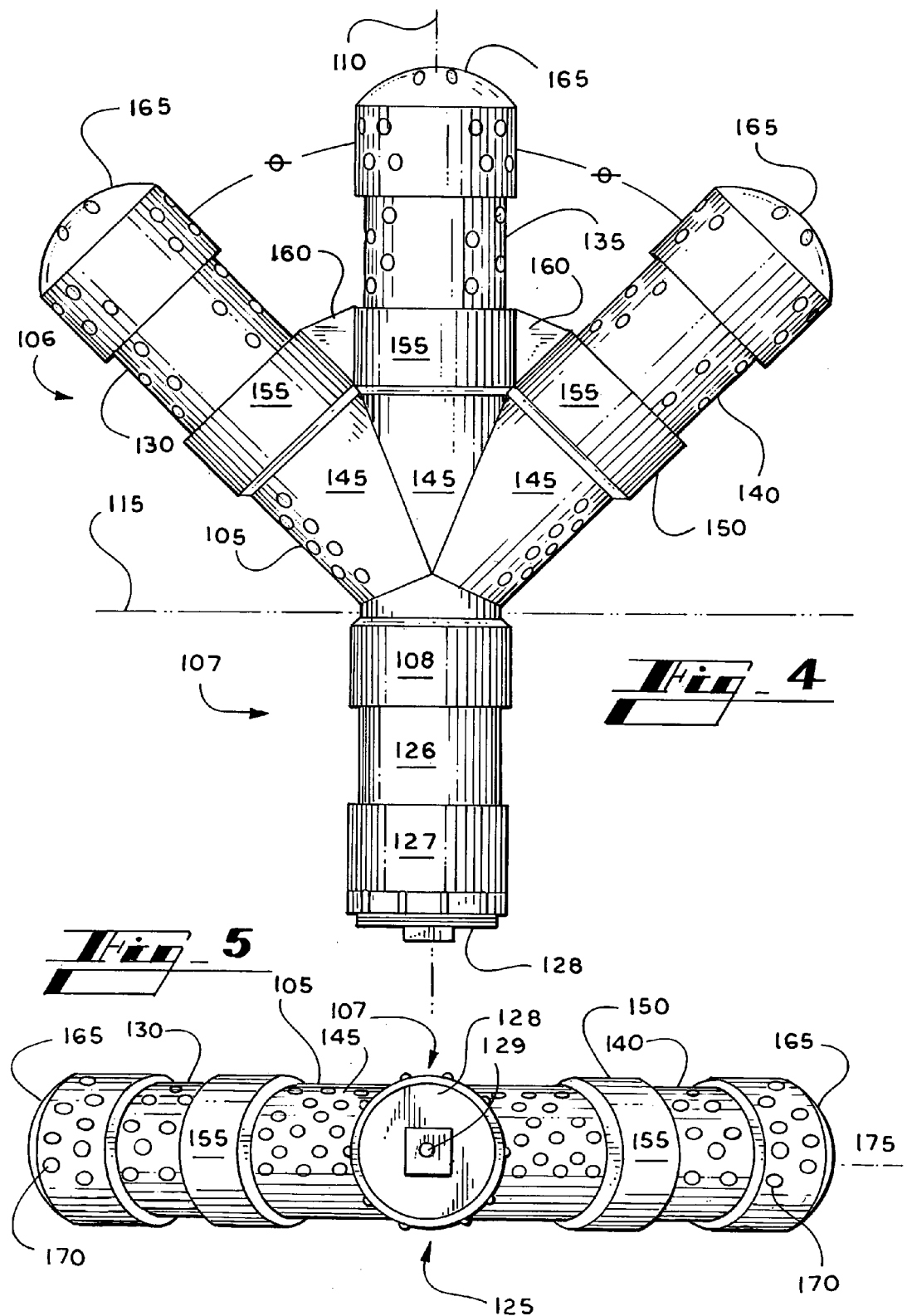

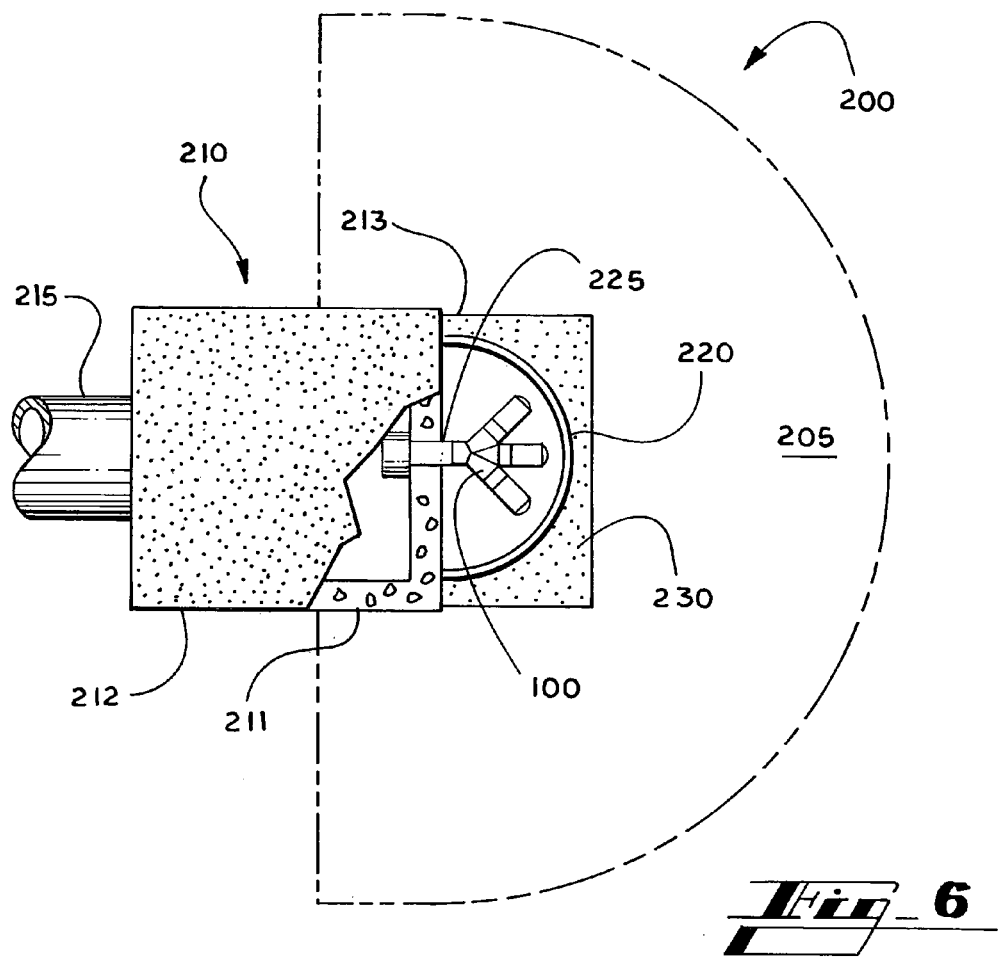
Fig_6
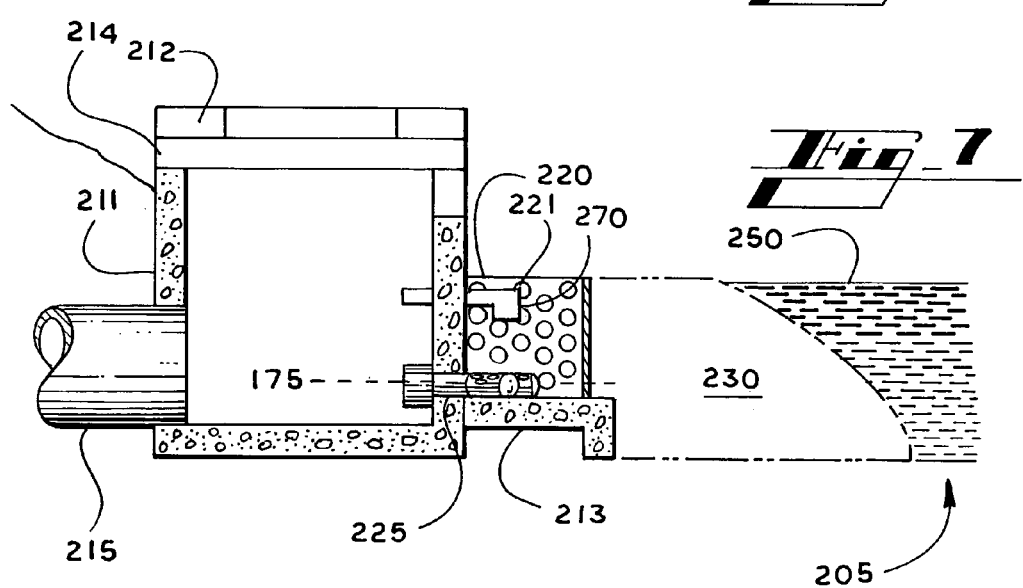
Fig_7

DETENTION POND WATER QUALITY APPARATUS AND SYSTEM

BACKGROUND

I. Field of the Invention

The present invention relates generally to the field of water quality enhancement and more particularly to an apparatus and system for permanent extended-detention basins to treat storm water runoff through gravitational settling.

II. Description of the Related Art

Permanent extended-detention basins and other types of detention/retention basins are used in order to impound and temporarily store storm water runoff for a specified period and discharge it through a hydraulic outlet structure to a down stream conveyance system. An extended-detention basin is usually dry during non-rainfall periods. These basins are necessary and designed to provide for one, or all of the following: a) water quality enhancement, b) channel erosion control and, c) downstream flood control. These basins are installed when impervious surfaces are created from new development activities, which include subdivisions, commercial sites and other new developments. Hydraulically speaking, these basins ensure that post-development will not be different from pre-development conditions.

A standard extended-detention basin includes inlet headwalls, which release storm water runoff to the basin from the storm water drainage pipes/system created by the installation of impervious surfaces for new development. Once the storm water runoff travels to the basin, it is detained and released through an outlet control structure at different design rates. The outlet control structure has an inlet side and an outlet side. The inlet side allows the impounded water to enter the outlet structure at different designed rates. These rates provide for water quality enhancement, channel erosion control, and downstream flood control. The outlet side consists of an outlet pipe, which allows the water to drain through the embankment dike. The typical extended-detention basin allows water to pass through the outlet structure up to the 100-year storm frequency (typically, 7.92 inches of rainfall in a 24 hour period). Once a 100-year storm frequency occurs an emergency spillway (indentation channel on and over the top of the embankment dike) is provided to allow the 100-year storm frequency to pass through the basin.

Extended-detention basins are typically designed to treat the first 1.2 inches of rainfall (also known as first flush) of storm water runoff by releasing it over a 24 to 48 hour period. In so doing, the quality of incoming storm water is improved through gravitational settling of the pollutants. To allow for this 24 to 48 hour draw down time water quality inlet (or orifice) must be sized to allow for the water to be detained for this period. The water quality volume is thus needed to calculate the correct size water quality orifice. The water quality volume is determined using a hydrological equation determined by local governmental regulations/ standards. This equation factors in all newly impervious surfaces and takes the first 1.2 inches of rain from these surfaces to determine the water quality volume. Once the water quality volume is determined the correct size orifice can be calculated using a hydrological equation determined by local governmental regulations/standards. The water quality orifice is then protected from clogging by a measure determined by the designer/engineer. There have been attempts to filter the debris, including using filter stone surrounding filter fabric that surrounds an elongated perforated pipe which sits on the basin floor and is attached to the outlet structure. This type of filtration system risks becoming clogged and water is unable to penetrate the elongated perforated pipe and thus cannot enter the outlet structure for release. An additional failed method was to drill the correct size water quality orifice directly into the outlet structure and place a ½ round perforated pipe surrounded by gravel in front of it. Often, water would overflow the ½ round pipe thus bypassing the filtration gravel. Therefore, larger debris such as large sediment, branches, leaves, garbage, can clog the water quality orifice of the outlet control structure, requiring maintenance after every rain event. It is therefore necessary to prevent the water quality orifice from becoming clogged so the extended-detention basin function as it was designed and the first 1.2 inches of rain drains in 24–48 hours.

After the first 1.2 inches of rainfall channel erosion control becomes the next factor in storm water management. To protect against channel erosion the 1-year storm frequency (or typically 3.36 inches of rainfall in 24 hours) is detained for a 24-hour period. To achieve the 24-hour draw down time a channel protection inlet (or orifice) is sized to release 3.36 inches of additional rainfall. This channel protection orifice is calculated from the channel protection volume. The channel protection volume is calculated using a hydrological equation determined by local governmental regulations/standards. This equation factors in all the newly impervious surfaces and takes 3.36 inches of storm water runoff from these surfaces to determine the channel protection volume. Once the channel protection volume is determined the correct size orifice can be calculated using a hydrological equation determined by local governmental regulations/standards. The channel protection orifice is protected from clogging by a measure determined by the designer/engineer. With this invention system the channel protection orifice is protected by an elbow piece of pipe that angles down inside the perforated pipe. On the inside of the structure on this pipe is a screwed in end cap where the corrected sized channel protection orifice is drilled at the invert of the cap. A trash rack may also be used to protect this orifice from clogging if the orifice is drilled exactly sized into the outlet structure.

The next concern that extended-detention basins address is flood control. To control flooding the peak flows of the 2-year through 25-year storm frequencies must be controlled so the flows from the developed site do not exceed those from pre-developed conditions at the project boundary. To accomplish this task v-notched weir, different sized orifices, square weirs, or some other method may be incorporated into the outlet structure to accomplish flood control.

SUMMARY

In general, the invention features a water quality apparatus sits inside a 48-inch ½ round pipe if the outlet structure is box shaped or a 48-inch ¾ round pipe if the outlet structure is round shaped. This 48-inch % or ¾ pipe is perforated with ½ inch min. holes from top to bottom. The height of the pipe is determined by the water quality elevation height. Surrounding all sides of this pipe is a # 4 size stone; this stone comes to the top of the pipe and extends out with a width of 2 feet. The stone provides added filtration before the storm water runoff enters the perforated pipe and water quality apparatus. The water quality apparatus sits on a gravel or concrete base at the bottom of the basin. The water quality apparatus is grouted into place. The sizes of the pipes and stone described above are variable.

The above extended-detention basin system includes a water quality aspect, a channel protection aspect and a flood control aspect; each of which treats different storm frequencies but are all based on a 24-hour rainfall event. The water quality aspect engages first, followed by (if necessary) channel protection concluding with flood control all the way up to the 100-year storm frequency.

The invention features a water quality device/apparatus that is utilized in permanent extended-detention basins to treat the first 1.2 inches of storm water for a given area. This detention pond water quality apparatus and system aims to minimize maintenance while enhancing water quality and ease of inspection. By using the ½ or ¾ round perforated pipe and the #4 stone in combination with the water quality device, the likelihood of clogging is greatly reduced with minimal maintenance.

The water quality device/apparatus includes a pipe fixture with an outlet end which fits into the outlet control structure and an inlet comprising several perforated pipes (forming a series of holes) that protrude into the or ¾ round perforated pipe. The purpose of the holes is to allow water to flow into the piping system, but discouraging any debris from flowing into the piping system and clogging it. As the water flows through the gravel, through the ½ or ¾ perforated pipe, into the water quality device/apparatus, through the correct sized water quality orifice, into the outlet control structure, out through the outlet pipe, through the embankment dike and released from the basin.

In general, in one aspect, the invention features an apparatus, including a hollow main body having a longitudinal axis, a forward end and a rear end, a plurality of hollow inlet pipes connected to the main body at the forward end and a hollow outlet pipe connected to the rear end.

In one implementation, the main body further includes pipe bases connected to each of the plurality of pipes.

In another implementation, the apparatus further includes end caps connected to each of the pipes.

In another implementation, the apparatus further includes a pipe cap connected to the outlet pipe.

In another implementation, the apparatus is a single integral piece with perforations and a water quality orifice in the lower portion.

In another implementation, the pipe cap is in threaded engagement with the outlet pipe.

In another implementation, the pipe cap includes a water quality orifice.

In another implementation, the apparatus includes an upper and lower portion.

In still another implementation, the upper portion includes a series of holes.

In yet another implementation, the holes are located on the main body and the inlet pipes.

In another aspect, the invention features a water quality system located in a water detention basin, the system including a hollow outlet control structure, an outlet pipe connected to the outlet control structure, a water quality inlet orifice, a semi-round pipe basin (such as half-round pipe) connected to the outlet control structure and surrounded the inlet orifice, a water quality apparatus connected to the water quality inlet orifice, the apparatus including a main body having a series of holes on an upper portion of the body, a longitudinal axis, a forward end and a rear end, a plurality of inlet pipes having a series of holes on an upper portion of the pipes, the pipes being connected to pipe bases located on the main body at the forward end, an outlet pipe connected to the rear end and a pipe cap having a water quality orifice, the pipe cap being in threaded engagement with the outlet pipe.

In one implementation, the outlet pipe of the water quality apparatus is located within the outlet control structure.

In another implementation, the water quality apparatus can vary in hollow diameter.

In another implementation, the plurality of inlet pipes on the water quality apparatus are located outside the apparatus and inside the semi-round pipe basin.

In another implementation, the system further includes gravel located around and in contact with the semi-round pipe basin.

In another implementation, the semi-round pipe basis includes a series of perforations.

In another implementation, the system can be used to detain storm water and during non-rain events allow the base flow of a creek to flow through the system.

In another implementation, the system can be used to detain storm water and not built on a creek or stream.

In another implementation, the outlet control structure further includes a certain distance between the water quality apparatus and the start of the overflow weir.

In another implementation, the system further includes a channel protection pipe connected to the outlet control structure and located between the overflow weir and the water quality apparatus.

In another aspect, the invention features a water quality kit, including a water quality apparatus having an inlet portion and an outlet portion, the outlet portion being adapted to the connected to the water quality inlet orifice of a detention pond control structure, the apparatus including a hollow main body having a series of holes located on an upper portion of the main body, a longitudinal axis, a forward end and a rear end, a plurality of hollow inlet pipes connected to the main body at the forward end and having a series of holes on an upper portion of the pipes and a hollow outlet pipe connected to the rear end, the outlet pipe having a threaded end.

In one implementation, the kit further includes a threaded pipe cap being adapted to be placed in threaded engagement with the threaded end of the outlet pipe.

In another implementation, the pipe cap includes a water quality orifice that is designed to control the outflow of water from the basin.

In another implementation, the kit further includes grout to connect the apparatus to the control structure and seal any leakage around the water quality apparatus.

One advantage of the invention is that it allows water to drain from the pond in virtually the same amount of time as by specification of the pond because debris typically does not clog the inlet of the control structure.

Another advantage of the invention is that a plurality of inlet pipes of the invention increase the available amount of surface area for filtered drainage.

Another advantage of the invention is that debris that gathers on the invention can easily be removed by hand, and further does not clog the control structure.

Another advantage of the invention is that it includes a pipe cap that can be removed to provide orifices of varying size that provide different flow rates through the invention.

Another advantage of the invention is that all aspects can be observed and maintenance can easily be identified.

Other objects, advantages and capabilities of the invention will become apparent from the following description taken in conjunction with the accompanying drawings showing the preferred embodiment of the invention.

BRIEF DESCRIPTION OF THE DRAWINGS

FIG. 2 illustrates a top view of an embodiment of a detention basin water quality apparatus;

FIG. 3 illustrates a front view of an embodiment of a detention basin water quality apparatus;

FIG. 4 illustrates a bottom view of an embodiment of a detention basin water quality apparatus;

FIG. 5 illustrates a rear view of an embodiment of a detention basin water quality apparatus;

FIG. 6 illustrates a partial cut away top view of an embodiment of a water control outlet system;

FIG. 7 illustrates a partial cut away side view of an embodiment of a water control outlet system;

FIG. 11 illustrates a perspective view of a detention pond in a moderately overflowed state after a rain event where the storm water runoff is detained for a designed period of time and the base flow still passes through.

DETAILED DESCRIPTION

Figure 1:
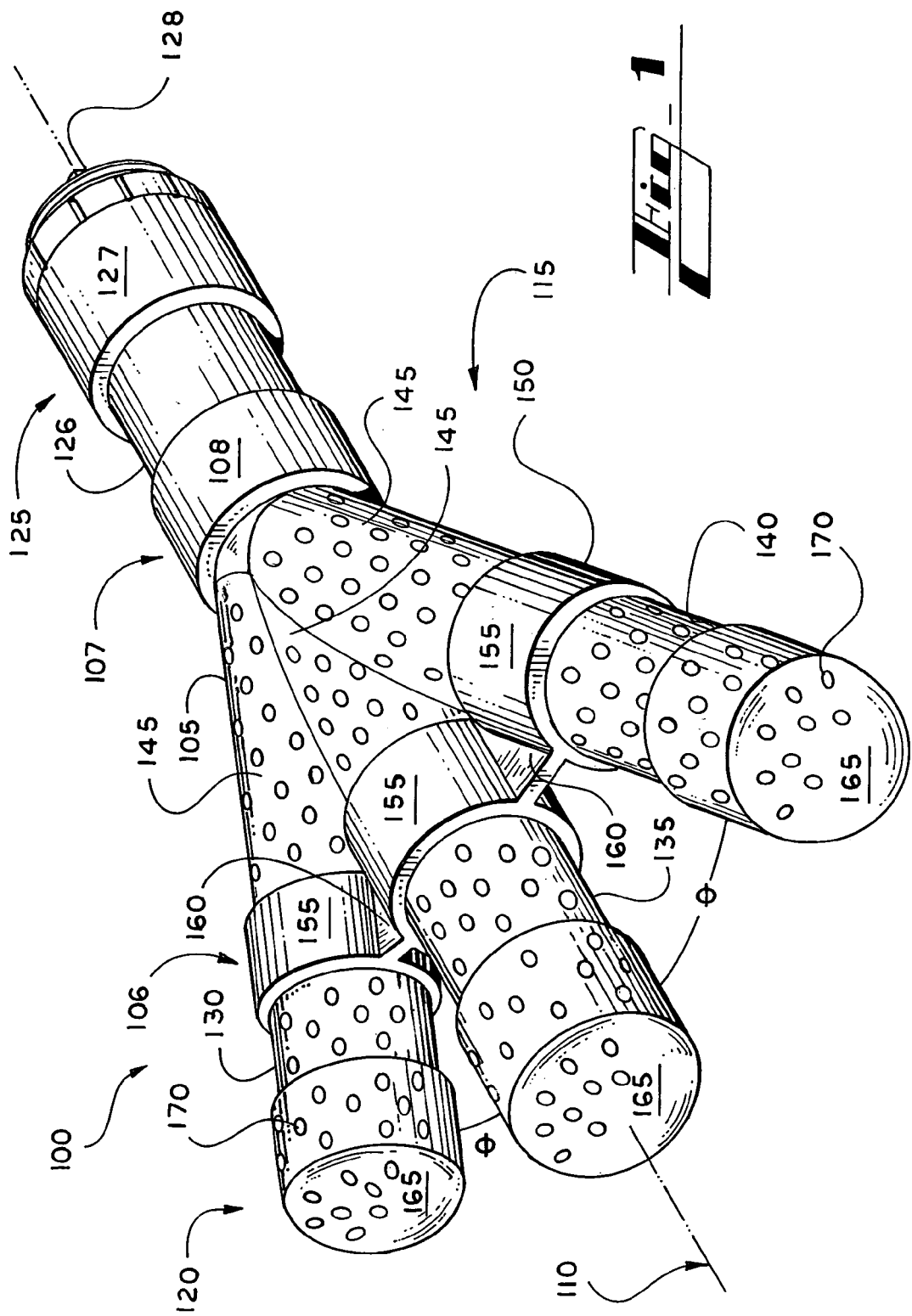
FIG. 1 illustrates a perspective view of an embodiment of a detention basin water quality apparatus.

Referring to the drawings wherein like reference numerals designate corresponding parts throughout the several figures, reference is made first to FIG. 1 that illustrates a perspective view of an embodiment of a detention basin water quality apparatus 100. The apparatus 100 generally includes a central body 105 oriented about a longitudinal axis 110. The central body 105 generally includes a forward end 106 and a rear end 107.

The apparatus 100 can further be defined and cut by a plane 115 separating the main body 105 into an inlet portion 120 and an outlet portion 125. The outlet portion 125 generally includes the rear end 107 of the main body 105 as well as an outlet pipe 126. The outlet pipe 126 typically includes a ring 127 connected to the end of the outlet pipe 126. In a typical implementation, the ring includes inner threads that are in threaded engagement with a removable pipe cap 128.

The inlet portion 120 generally includes the forward end 106 of the main body 105 as well as pipes 130, 135, 140. Another way of defining the inlet portion 120 is by defining a plurality of pipes that include the pipes 130, 135, 140. In general, the inlet portion 120 can include any number of suitable pipes. In the embodiment shown in the figure, the inlet portion 120 is defined by the three pipes 130, 135, 140. In a typical implementation, the pipes 130, 135, 140 are oriented with respect to each adjacent pipe 130, 135, 140 by an angle Θ.

The main body 105 is a junction between the inlet portion 120 and the outlet portion 125. From the rear end 107, the main body 105 fans out into several pipe bases 145. Each of the pipe bases 145, in turn, tapers into the rear end 107 that is predominantly defined as a ring 108. Each respective pipe base 145 generally has a cylindrical cross section at the end that connects to the pipes 130, 135, 140. However, each of the pipe bases 145 merge into each other and taper into the rear end 107. In the embodiment shown, there are three pipe bases 145 although, as described above with respect to the pipes 130, 135, 140, there can be fewer or more pipe bases 145. The pipe bases 145 terminate into a ring brace 150, each pipe base 145 having a respective ring 155. The ring brace 150 is connected to the three pipes 130, 135, 140 to provide support for the inlet portion 120 with respect to the pipes 130, 135, 140. A flange 160 is defined and connected between adjacent rings 155 to provide further support between the pipes 130, 135, 140. The pipes 130, 135, 140 each respectively protrudes from their respective pipes base 145 and ring 155. Each pipe 130, 135, 140 terminates in an end cap 165.

In general, the entire apparatus 100 is hollow. The pipes 130, 135, 140 and the outlet pipe 126 each generally have a cylindrical shape and hollow interior. As mentioned above, the pipe bases 145 of the main body 105 each generally have a cylindrical cross section at the ring 155 end and taper and merge into a single piece adjacent the rear end 107 and ring 108. Therefore, the hollow interior of the main body 105 is generally a merger of the interiors of the pipe bases 145. All of the hollow interiors of the pipes 130, 135, 140, the outlet pipe 126 and the main body 105 are continuous and contiguous so that there can be a continuous flow of water from the inlet portion 120 to the outlet portion 125. As is appreciated further throughout the detailed description, the generally hollow interiors allow for free flow of water through the apparatus 100.

The apparatus 100 generally further includes a series of holes 170 at various points of he apparatus 100. The holes 170 allow water to flow into the apparatus 100 as needed. In a typical embodiment, the holes 170 are located on a portion of the main body 105 and a portion of the pipes 130, 135, 140 including a portion of the end caps 165. The locations of the holes 170 are discussed further in the description below.

FIG. 2 illustrates a top view of an embodiment of a detention basin water quality apparatus 100 having the central body 105 having the forward and rear ends 106, 107 and oriented about the longitudinal axis 110. The plane 115 generally separates the main body 105 into an inlet portion 120 having the forward end 106 of the main body 105 as well as the pipes 130, 135, 140, and an outlet portion 125 having the rear end 107, the ring 108, the outlet pipe 126 ring 127 and pipe cap 128. The pipes 130, 135, 140 are typically oriented with respect to each adjacent pipe 130, 135, 140 by an angle Θ. The main body 105 typically includes the pipe bases 145, one end terminating in the ring 108, the other ends terminating in the ring brace 150, each pipe base 145 having a respective ring 155 and flanges 160. The ring brace 150 is connected to the three pipes 130, 135, 140 that respectively protrudes from their respective pipes base 145 and ring 155. Each pipe 130, 135, 140 terminates in an end cap 165. The apparatus 100 is generally hollow and includes a series of holes 170 as described above.

FIG. 3 illustrates a front view of an embodiment of a detention basin water quality apparatus 100. This figure generally illustrates the forward end 106 and inlet portion 120 of the apparatus 100. The figure illustrates the main body 105 and the front angular orientation of the pipes 130, 135, 140 and respective end caps 165 and pipe bases 145. The ring base 150 having rings 155 and flanges 160 is also shown. The figure further illustrates that the apparatus 100 can be further divided by a plane 175 that defines the apparatus into an upper portion 180 and a lower portion 185. The division of the upper and lower portions 180, 185 illustrates that the upper portion 180 includes the holes 170 on the main body 105, pipes 130, 135, 140 and end caps 165. The lower portion 185 does not include the holes 170 on a portion of the apparatus 100. As is further appreciated in the discussion below, the apparatus 100 begins to receive water once the level of the water rises above the plane 175. Once the water rises above the plane 175, water can begin to seep into the holes 170. Once water flows into the apparatus 100, the water generally flows from the inlet portion 120 to the outlet portion 125. The small surface are of the apparatus 100 that does not include holes 170 on the lower portion 185 is desirable so that sediment and other debris does not unnecessarily enter the apparatus 100 from beneath the apparatus. In addition, with the lack of holes 170 on the bottom of the apparatus 100, plants and other growth is prevented from growing into the apparatus 100. It is understood that in other implementations, the holes can be located on any area of the apparatus 100 including all areas of the upper and lower portions 180, 185.

FIG. 4 illustrates a bottom view of an embodiment of a detention basin water quality apparatus 100 having the central body 105 shaving the forward and rear ends 106, 107 and oriented about the longitudinal axis 110. The plane 115 generally separates the main body 105 into an inlet portion 120 having the forward end 106 of the main body 105 as well as the pipes 130, 135, 140, and an outlet portion 125 having the rear end 107, the ring 108, the outlet pipe 126 ring 127 and pipe cap 128. The pipes 130, 135, 140 are typically oriented with respect to each adjacent pipe 130, 135, 140 by an angle Θ. The main body 105 typically includes the pipe bases 145, one end terminating in the ring 108, the other ends terminating in the ring brace 150, each pipe base 145 having a respective ring 155 and flanges 160. The ring brace 150 is connected to the three pipes 130, 135, 140 that respectively protrudes from their respective pipes base 145 and ring 155. Each pipe 130, 135, 140 terminates in an end cap 165. The apparatus 100 is generally hollow as described above. This view of the embodiment of the apparatus 100 illustrates that the lower portion 185 includes a surface area that does not typically include any holes 170.

FIG. 5 illustrates a rear view of an embodiment of a detention basin water quality apparatus 100. This figure generally illustrates the rear end 107 and outlet portion 125 of the apparatus 100. The figure illustrates the main body 105 and the rear angular orientation of the pipes 130, 135, 140 and respective end caps 165 and pipe bases 145. A portion of the ring base 150 having rings 155 is also shown. The figure further illustrates the plane 175 that defines the apparatus into an upper portion 180 and a lower portion 185. Although it is generally desirable to include the holes 170 on the upper portion 180, the figure shows the apparatus 100 inverted with the holes 170 on the lower portion 185 to illustrate that the apparatus 100 could be oriented so that the holes 170 can be located below the plane 175. In general, as described above, once water flows into the apparatus 100, the water generally flows from the inlet portion 120 to the outlet portion 125. The figure further illustrates that the pipe cap 128 includes an orifice 129 that leads into the hollow interior of the apparatus 100. As discussed in further detail in the description below, the orifice 129 is designed to allow a certain flow of water from the apparatus 100 during a storm event. Therefore, different pipe caps 128 with different sized orifices 129 can be connected to the outlet pipe 126 to provide different flow rates to the apparatus 100. The orifice is typically located in the lower portion 185 so that water located within the apparatus 100 can completely drain from the apparatus 100.

In a typical embodiment, the apparatus is constructed of a suitable material that is durable and long lasting such as polyvinylchloride (PVC). It is contemplated that in other embodiments, other suitable materials can be used.

FIG. 6 illustrates a partial cut away top view of an embodiment of a water control outlet system 200. As described above, the apparatus 100 is typically used in permanent extended dry detention ponds and other types of water detention basins that are used in order to collect water in a concentrated area during storm events. Therefore, the system 200 includes a pond shown as pond area 205. The system 200 further includes an outlet control structure 210 from which a large outlet pipe 215 allows the water to drain. The control structure 210 typically includes a large hollow housing 211 and a lid or top 212. A base 213 typically is included in front of the control structure 210. In a typical embodiment, the outlet control structure 210 is concrete but can be other materials such as corrugated metal pipe or CMP. The lid 212 typically further includes a man access point 217.

An inlet portion of the control structure 210 is surrounded by a large semi-round (typically half round or three-quarter) pipe basin 220 with perforations (see FIG. 7 below). The large semi-round pipe 220 typically rests on the base 213 and surrounds an inlet hole on 225 the outlet control structure 210. The semi-round pipe 220 can vary in the amount of full circle that is encompassed in the pipe 220. Typically, for a square control structure 210, the pipe 220 is half round. For a circular control structure (not shown) the pipe 220 is three quarter round. It is understood that various different types of pipe are used in other embodiments. Gravel 230 (typically #4 stone although other types of stone are contemplated) typically surrounds the exterior of the semi-round pipe 220 and in contact with the storm water from the pond area 205. The gravel 230 provides filtration before the water enters the semi-round pipe basin 220 and the control structure 210.

The system 200 further includes the embodiment of a detention pond water quality apparatus 100 as described above. Since water overflows over the semi-round pipe basin 220 thereby bypassing the filtration gravel 230, the apparatus 100 is placed in the inlet hole 225 to provide filtration of the water that overflows the semi-round pipe basin 220 thereby preventing larger debris such as large sediment, branches, leaves, garbage and the like from clogging the inlet hole 225 of the control structure 210. The apparatus 100 typically rests on the base 213. In another embodiment, the base 213 can be gravel instead of concrete to provide further filtration underneath the apparatus 100.

Typically, the outlet portion 125 of the apparatus 100 (which includes the entire or a portion of the rear end 107) is connected to the inlet hole 225 (water quality orifice) of the control structure 210. It is understood that different areas of the apparatus 100 can be connected into the inlet hole 225. However, it is desirable that the surface area of the apparatus 100 including the greatest number of holes 170 is far enough away from the control structure 210 so that the flow of water into the apparatus 100 is not impeded. In a typical implementation, the apparatus 100 can be connected by concrete or grout, or any other suitable material. Grout is typically used to connect the typical concrete outlet structure 210 to the typical PVC apparatus 100. The grout or concrete is used to secure the apparatus 100 to the control structure 210 and to prevent leakage around the apparatus into the interior of the control structure 210.

FIG. 7 illustrates a partial cut away side view of an embodiment of a water control outlet system 200. As described above, the system 200 includes the pond area 205, the control structure 210 having housing 211, top 212 and base 213, and large outlet pipe 215. The outlet structure 210 further includes inlet hole 225 surrounded by the large semi-round pipe basin 220 with perforations 221. Gravel 230 surrounds the exterior of the semi-round pipe basin 220 and in contact with the storm water 250 from the pond area 205. The apparatus 100 is further included in the system 200 and rests on the base 213. The figure further illustrates that the control structure 210 typically also includes an overflow weir 214 between the housing 211 and the top 212. The overflow weir 214 is open to the hollow interior of the housing 211. In certain events, the storm water can rise to the level of the space 214 and water flows into the outlet control structure 210 in order to prevent flooding. Grating can be placed around this overflow weir 214 to prevent large debris from flowing into the hollow interior of the control structure 210. In large storm events, water typically flows into overflow weir 214 and possibly an accompanying "v" notch of square weir to allow for the peak flow rates of the 2–25 year storm frequencies. These features help to prevent off-site flooding. If a storm frequency greater than 25 years enters the basin, it is typically detained and released and the peak 25 year rate is controlled. The 25 year up to the 100 year rate typically flows through the overflow weir 214 until it reaches the 100-year frequency where it then passes over a dam or specified area called the emergency spill-way. These features are based on basic required design standards for extended detention basins. The control structure 210 can further include a channel protection pipe 270 based on a one year storm frequency.

It is now appreciated that during a storm event, storm water 250 gathers in the pond (or basin) area 205 and slowly seeps through the gravel 230 into the semi-round pipe basin 220 through the perforations 221. With the apparatus 100 in place, as water gathers in the semi-round pipe basin 220, the water flows through the holes 170 on the pipes 130, 135, 140 and main body 105 on the apparatus 100. As described above, the water flows through the apparatus 100 from the inlet portion 120 to the outlet portion 125, through the orifice 129 on the pipe cap-invert 128 and into the outlet control structure 210. Once in the outlet control structure 210, the water finally flows through the outlet pipe 215. The apparatus 100 is typically desirable to filter the first flush volume of water during a storm event for purposes of enhancing the water quality before leaving the site for nearby streams, rivers and other bodies of water of site.

It is further appreciated that if the storm water 250 does overflow the gravel 230 and the semi-round pipe basin 220, directly into the semi-round pipe 220, that debris may also flow into the semi-round pipe 220. In such a case, the apparatus 100 prevents this debris from clogging the inlet hole 225 and control structure 210. Typically, the holes 170 on the pipes 130, 135, 140 and the main body 105 are small enough to prevent the large clogging debris from entering the inlet hole 225 and control structure 210. However, the individual pipes 130, 135, 140 are fanned and spread out independently of one another thereby increasing the available filtering surface area through which the storm water can flow. Therefore, if one of the pipes 130, 135, 140 becomes lodged with a large piece of debris, the other pipes 130, 135, 140 are available for allowing the water to flow through the apparatus 100.

Furthermore, in a typical embodiment where the holes 170 are located on the apparatus 100 above the plane 175 as described with respect to FIGS. 3 and 5, water in the semi-round pipe 220 typically does not flow into the apparatus once that level is below the plane. In such an implementation, finer sediments and debris are not able to flow into the apparatus from underneath the apparatus 100 and therefore the inlet hole 225 and control structure 210. This feature further prevents finer sediments from gathering and clogging the control structure 210 and the apparatus 100 itself. Furthermore, any plant growth underneath the apparatus 100 is prevented from growing into the apparatus.

In still another feature of the apparatus, once the storm water has drained, the apparatus 100 is readily visible from the top of the semi-round pipe basin 220 for inspection and maintenance. After the water has drained, a technician can remove any debris from the pipes 130, 135, 140 and main body 105 that may still be resting on top of or around the apparatus 100. Furthermore, the pipe cap 128 can be removed from the inside of the control structure 210 to inspect the hollow interior of the apparatus 100 to ensure that no debris has entered the apparatus. In the case when debris has entered the apparatus 100, it can easily be removed when the pipe cap 128 is removed. It is now appreciated that since the lower portion 185 of the apparatus does not include any holes 170, if any sediment or debris has entered the apparatus 100, there is a smooth surface inside the apparatus 100 that is free of holes in which sediment and debris can easily be cleaned. Furthermore, if a different pipe cap 128 with a different size orifice 129 needed to be placed, it can be placed inside the control structure 210.

Figure 8:
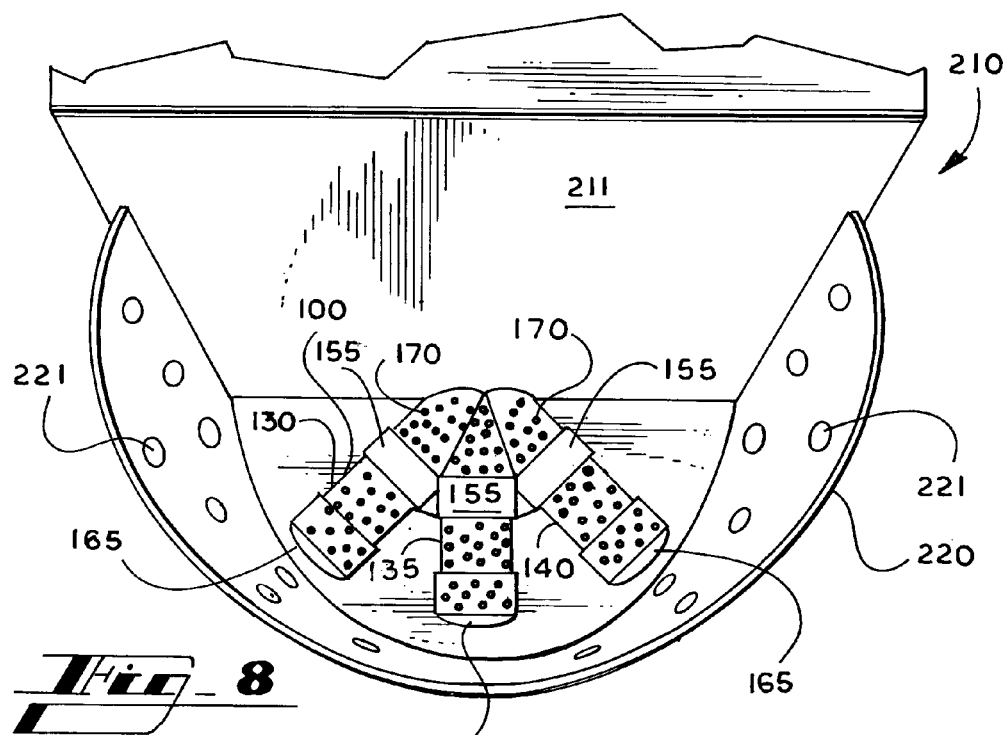
FIG. 8 illustrates a top view of an embodiment of a detention basin water quality apparatus connected to an outlet control structure.

FIG. 8 illustrates a top view of an embodiment of a detention pond water quality apparatus 100 connected to an outlet control structure 210. This figure illustrates a clean and dry semi-round pipe basin 220 having perforations 221 and a clean and dry apparatus 100 before a storm event or after cleaning and drying after a storm event. The apparatus 100 including the pipes 130, 135, 140, main body 105 and pipe bases 145 are clear of debris. The semi-round pipe 220 is also free of debris and water. The outlet control structure 210 can have a constant flow of water through gravel 230 through semi-round pipe 220 and into the apparatus 100 if the extended detention basin is built online (that is, on a creek or stream).

Figure 9:
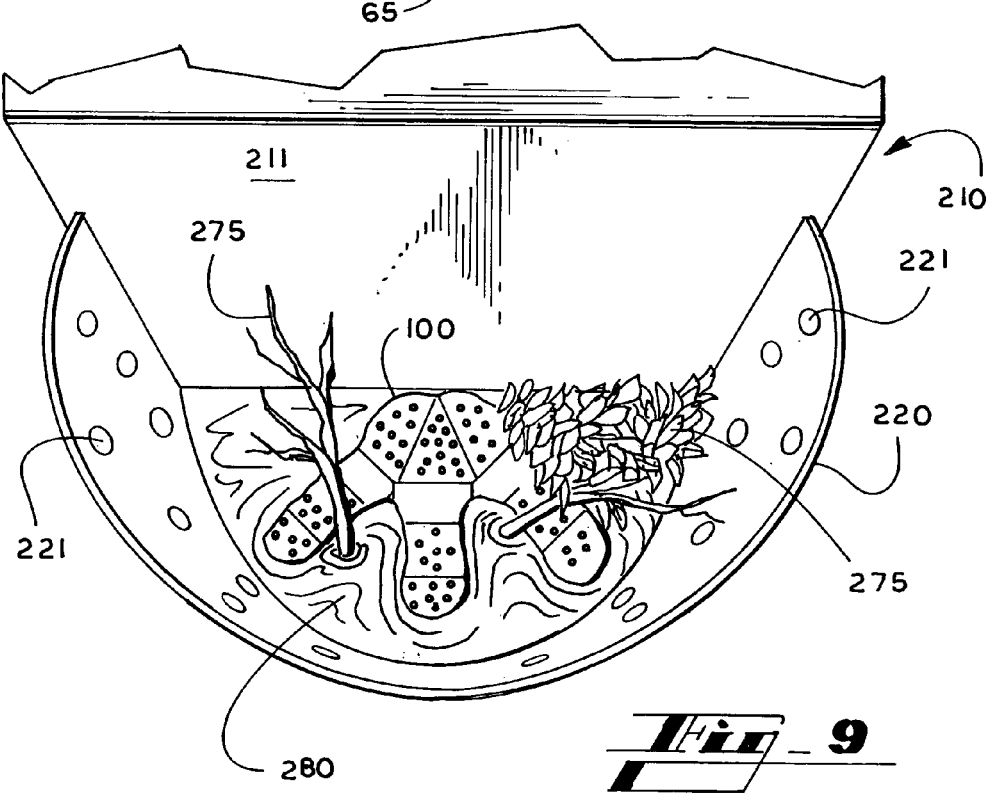
FIG. 9 illustrates a top view of an embodiment of a detention pond water quality apparatus connected to an outlet control structure and having debris.

FIG. 9 illustrates a top view of an embodiment of a detention pond water quality apparatus 100 connected to an outlet control device 210. This figure illustrates that the semi-round pipe basin 220 having perforations 221 has debris 275 and residual water 280 and that pipes 130, 135, 140 of the apparatus 100 are covered with the debris 275 and partially surrounded by the water 280. This figure can be a typical illustration of a post-storm event situation where the storm water 280 and debris 275 has overflown the semi-round pipe basin 220 and where the storm water 280 has subsequently drained from the pond and into the control structure 210. The apparatus 100 including the pipes 130, 135, 140, main body 105 and pipe bases 145 includes a fair amount of the debris 275 that can subsequently be removed. Without the apparatus 100 in place, the same debris 275 has been prevented from clogging the inlet hole 225 and the control structure 210 and thereby prevented the unnecessarily slow drainage of the storm water from the detention pond. As discussed above, the large filter surface area provided by the pipes 130, 135, 140 still allows controlled drainage through the holes 170 despite the presence of the debris 275 on the pipes 130, 135, 140. It is understood that in other embodiments, the apparatus 100 can include additional pipes in order to further increase the available independent surface area from draining.

Figure 10:
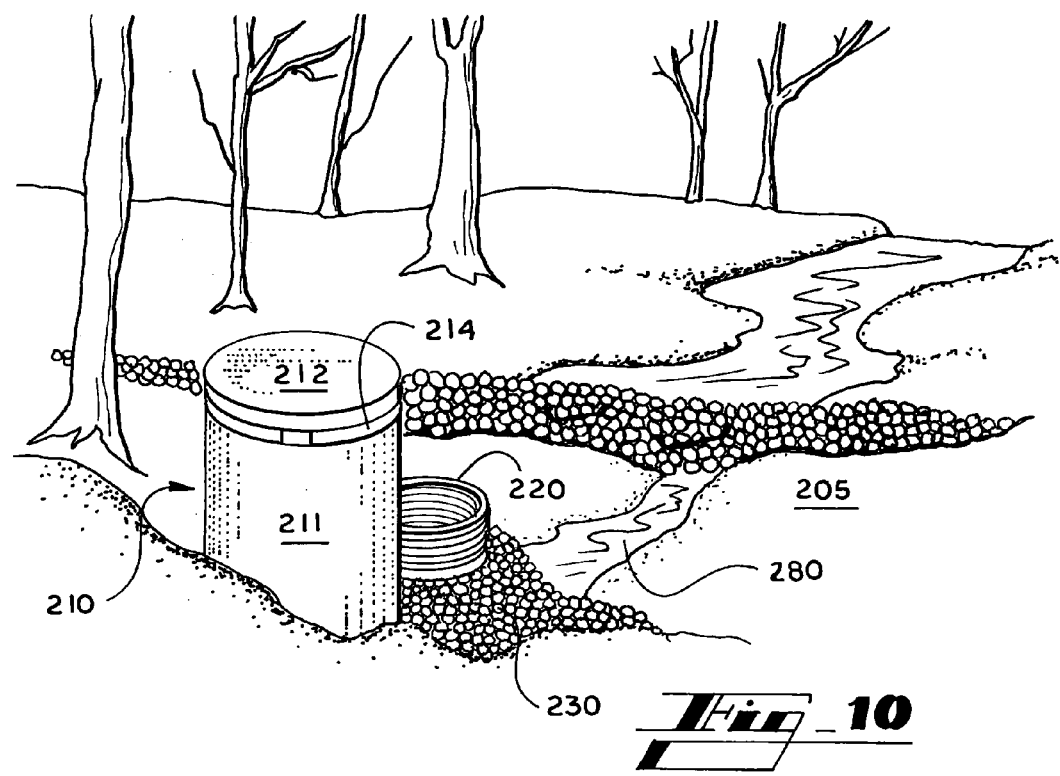
FIG. 10 illustrates a perspective view of a detention pond built on a creek or stream in a moderately empty state through which the base flow travels.

FIG. 10 illustrates a perspective view of a detention pond area 205 in a moderately empty state with a constant base flow (creek or stream). As mentioned above, the outlet control structure 210 including the apparatus can be located on a basin that is not connected to a creek or stream. This figure illustrates the pond area 205 where the majority of the base flow of the creek or stream 280 has drained though the control structure 210. The control structure 210 shown is round and includes the housing 211, top 212 and overflow weir 214. Gravel 230 surrounds the three quarter round pipe 220 shown. The apparatus 100 is at the bottom of the three quarter round pipe.

Figure 11:
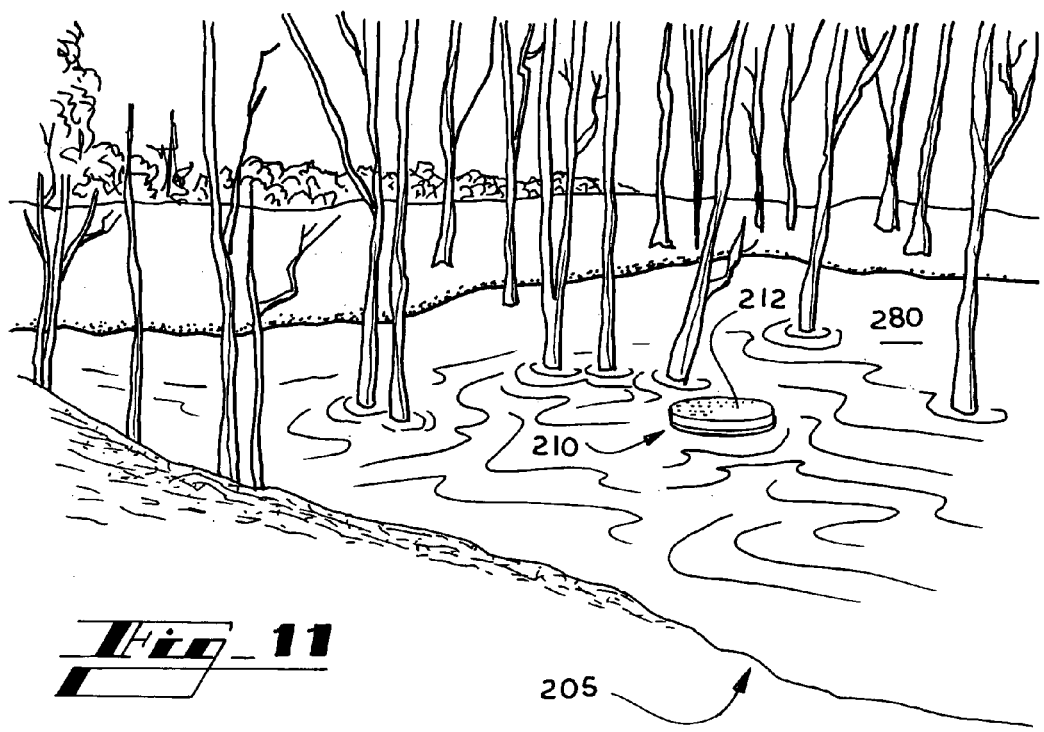

FIG. 11 illustrates a perspective view of a detention pond area 205 in a moderately overflowed state being filled with storm water 280. The figure illustrates that the pond area 205 is filled to such an extent that only the top 212 of the control structure 210 is showing. This situation is a typical event where the semi-round pipe 220 has been overflowed and submerged therefore typically resulting in debris from gathering in the semi-round pipe basin 220. Therefore, the apparatus is used in order to prevent the debris from flowing into and clogging the control device 210.

The foregoing is considered as illustrative only of the principles of the invention. Further, various modifications may be made of the invention without departing from the scope thereof and it is desired, therefore, that only such limitations shall be placed thereon as are imposed by the prior art and which are set forth in the appended claims.

What is claimed is:

1. A water quality system located in a water detention pond, the system comprising:
    a hollow control structure;
    an outlet pipe connected to the control structure;
    a water quality inlet orifice;
    a semi-round pipe basin connected to the control structure and surrounded the inlet orifice;
    a water quality apparatus connected to the water quality inlet orifice, the apparatus comprising:
    a main body having a series of holes on an upper portion of the body, a longitudinal axis, a forward end and a rear end;
    a plurality of inlet pipes having a series of holes on an upper portion of the pipes, the pipes being connected to pipe bases located on the main body at the forward end;
    an outlet pipe connected to the rear end; and
    a pipe cap having a water quality orifice, the pipe cap being in threaded engagement with the outlet pipe.

2. The system as claimed in claim 1 wherein the outlet pipe of the water quality apparatus is located within the control structure.

3. The system as claimed in claim 1 wherein the plurality of inlet pipes on the water quality apparatus are located outside the apparatus and inside the semi-round pipe basin.

4. The system as claimed in claim 1 further comprising gravel located around and in contact with the semi-round pipe basin.

5. The system as claimed in claim 1 wherein the semi-round pipe basin includes a series of perforations.

6. The system as claimed in claim 1 wherein the outlet control structure further includes a top covering the outlet control structure and forming an overflow weir between the outlet control structure and the top.

7. The system as claimed in claim 6 further comprising a channel protection pipe connected to the control structure and located between the weir and the water quality apparatus.

* * * * *